US010569747B2

(12) United States Patent
Trebouet et al.

(10) Patent No.: US 10,569,747 B2
(45) Date of Patent: Feb. 25, 2020

(54) SENSOR CLEANING DEVICE FOR A MOTOR VEHICLE

(71) Applicant: Valeo Systèmes d'Essuyage, Le Mesnil Saint Denis (FR)

(72) Inventors: Marcel Trebouet, Chavenay (FR); Giuseppe Grasso, Le Breuil sur Couze (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 434 days.

(21) Appl. No.: 15/214,508

(22) Filed: Jul. 20, 2016

(65) Prior Publication Data

US 2017/0021810 A1    Jan. 26, 2017

(30) Foreign Application Priority Data

Jul. 22, 2015   (FR) .................................... 15 56959

(51) Int. Cl.
*B60S 1/62* (2006.01)
*B05B 1/32* (2006.01)
*B08B 3/02* (2006.01)
*B08B 5/02* (2006.01)

(52) U.S. Cl.
CPC ................ *B60S 1/62* (2013.01); *B05B 1/326* (2013.01); *B08B 3/02* (2013.01); *B08B 5/02* (2013.01)

(58) Field of Classification Search
None
See application file for complete search history.

(56) References Cited

U.S. PATENT DOCUMENTS

| 4,331,295 | A   | * | 5/1982 | Warihashi | ................. B05B 1/10 239/284.1 |
| 7,753,287 | B2  | * | 7/2010 | Lopez     | ................. F04D 15/0016 239/284.1 |
| 8,366,021 | B2  | * | 2/2013 | Trager    | ..................... B60S 1/50 239/284.1 |
| 2015/0138357 | A1 | | 5/2015 | Romack et al. | |

FOREIGN PATENT DOCUMENTS

| CN | 104369720 A | 2/2015 |
| CN | 104442726 A | 3/2015 |
| CN | 106167001 A | 11/2016 |
| EP | 1970269 A2 | 9/2008 |

OTHER PUBLICATIONS

Preliminary Report and Written Opinion Issued in Corresponding French Application No. 1556959, dated May 26, 2016 (7 Pages).
The First Office Action issued in corresponding Chinese Application No. 201610811827.X, dated Jun. 26, 2018 (12 pages).

* cited by examiner

*Primary Examiner* — Cristi J Tate-Sims
(74) *Attorney, Agent, or Firm* — Osha Liang LLP

(57) ABSTRACT

The invention consists in a device for cleaning a sensor of a motor vehicle.

Figure 1:
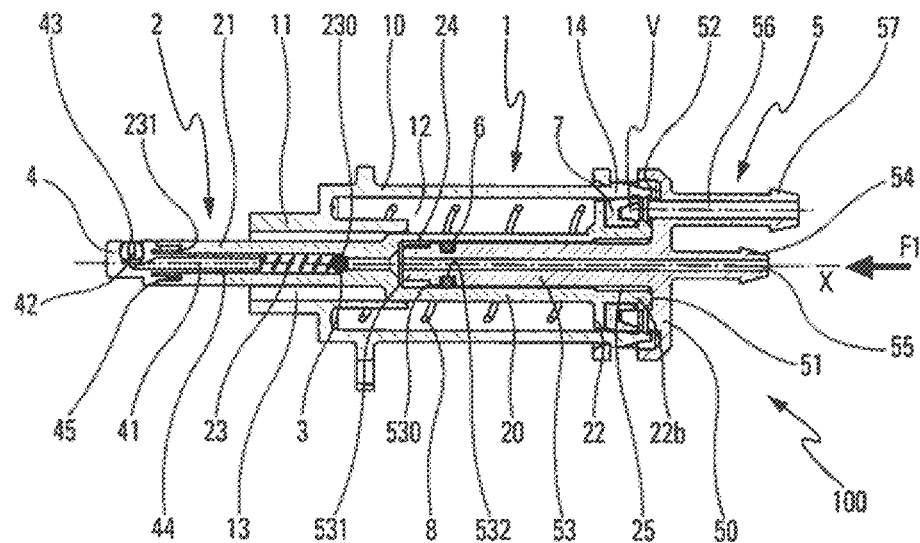

A piston (2) is able to slide in a circular hollow body (1) having a longitudinal axis (XX) and carrying at a first end a single nozzle (4) for distributing one or more fluids, said piston being hollow to enable the routing to the nozzle of at least one first fluid.

The hollow piston is rendered mobile, between a rest position and a working position, by the effect of a second fluid to take up a working position in which the nozzle is deployed.

21 Claims, 2 Drawing Sheets

SENSOR CLEANING DEVICE FOR A MOTOR VEHICLE

The present invention relates to the field of driver assistance devices and more particularly to the field of the sensors used for this purpose, such as imaging means, in particular video cameras, or detection means using electromagnetic waves, in particular radars or lidars. In this field, the invention is more particularly directed to the devices for cleaning such imaging means.

Sensors equip an increasingly large number of motor vehicles in order to assist the driver of the vehicle in certain driving situations, one well known instance of which is to assist with parking. For this assistance to be as effective as possible, the images supplied by the imaging means, or the data transmitted by the radars, for example, must be of the best possible quality, and it is therefore essential for the faces of these sensors that face toward the outside of the vehicle to be clean. To this end, a device for cleaning the sensor may be associated with that sensor, and controlled to inject, onto said sensor, a flow of cleaning fluid just before detection is carried out. It is beneficial to control the device to determine the duration and the starting time of the cleaning sequence and to be able to retract the cleaning device after use, so that they do not interfere with detection when the sensors are operating, and so that they are protected from impacts, for example. Moreover, they must be as compact as possible to address the overall size constraints of the vehicle. Furthermore, there is the aim that such devices enable the injection of different fluids, gas or liquid. In fact, when a cleaning liquid is sprayed onto the sensor, for example the lens of an imaging video camera, to expel dirt from it, it is beneficial to dry this lens quickly in order to prevent any risk of pollution of the image by any traces that such a liquid might leave (spots, streaks, etc.).

The present invention has the aim of optimizing a cleaning device of this type, both in terms of its cleaning performance and in terms of its overall size.

To this end, the present invention consists in a device for cleaning a sensor of a motor vehicle, which includes a piston able to slide in a circular hollow body having a longitudinal axis and carrying at a first end a single nozzle for distributing one or more fluids. The piston is hollow to enable the routing to the nozzle of at least one first fluid and is rendered mobile, between a rest position and a working position, by the effect of a second fluid to take up a working position in which the nozzle is deployed.

In particular, the device in accordance with the invention includes means for the selective admission and routing of one or more distinct fluids to this sine distribution nozzle.

The means for selective admission and routing of one or more fluids may notably include a first fluid admission tip, centred on the longitudinal axis of the circular hollow body, and a second fluid admission tip eccentric relative to said first fluid admission tip. These fluid admission tips may project from an inlet flange coming to cover the hollow body and the piston at the end opposite the nozzle.

In accordance with one feature of the invention, the second fluid is routed to an interior volume, delimited by at least one wall of the hollow piston. Also, the hollow piston and the means for selective admission and routing of one or more fluids may be such that when the hollow piston is in said working position the second fluid is routed via the hollow piston to the cleaning nozzle, either so that the second fluid is routed via the hollow piston to the cleaning nozzle or so that the second fluid is immobilized in said interior volume.

In accordance with various features of the invention:

the hollow piston includes a substantially cylindrical central part, able to slide inside a hollow tube coaxial with a hollow body of the device in accordance with the invention. The hollow piston advantageously also includes a distribution terminal part in which the single distribution nozzle can be inserted and immobilized, and an admission part able to slide inside a first cavity of the hollow body, of greater diameters than the hollow tube of the same hollow body.

a distribution through-conduit, a routing through-chamber, and an admission through-chamber coaxial with one another and with the hollow body and communicating with one another are respectively arranged in the distribution terminal part, the central part, and the admission part of the hollow piston. The distribution conduit advantageously communicates with a distribution channel of the distribution nozzle, itself connected to an injection channel that leads to an injection orifice of this single distribution nozzle.

the inside diameter of the routing chamber is enlarged, in the vicinity of the area through which the routing chamber communicates with the admission chamber and the inside diameter of the admission chamber is, over all the length of the latter, at least equal to the enlarged diameter of the routing chamber.

the inside diameter of the distribution conduit has, in the vicinity of the area through which the distribution conduit communicates with the routing chamber, a constriction, and the shoulder formed, inside the distribution conduit, by this constriction, accepts a non-return valve.

In accordance with an important feature of the invention, the means for selective admission and routing of one or more fluids include an inlet flange adapted to cooperate simultaneously with a tip of the admission part and with a terminal tip of the hollow body in order to block the assembly formed by the hollow body and by the hollow piston opposite the single distribution nozzle.

A routing tube advantageously extends, from the inlet flange, inside the admission chamber and the routing chamber. In accordance with the invention, this routing tube is able to slide inside these chambers, coaxially with them, and is extended, opposite them, from the inlet flange, by a first admission tip. Moreover, in accordance with the invention, a second admission tip extends from the inlet flange in the same direction as the first admission tip. A first admission through channel that is coaxial with the routing chamber and with the admission chamber is advantageously arranged inside the routing tube and the first admission tip, and a second admission through-channel is arranged inside the second admission tip and the inlet flange. The second admission channel advantageously leads into an interior volume delimited, inside the device in accordance with the invention, by the inlet flange, the admission part, and the hollow body.

In accordance with another important feature of the invention, there is an annular groove at the periphery of the routing tube, in the vicinity of its end opposite that at which it extends from the net flange. This annular groove is advantageously adapted to receive an O-ring which seals the sliding of the routing tube inside the smaller inside diameter part of the routing chamber. To be more precise, the dimensions of the O-ring are such that, when it is in the enlarged diameter part of the routing chamber and in the admission chamber, it enables communication between the interior volume defined above and the routing chamber. In other words, this O-ring provides for sealed sliding of the routing tube inside the routing chamber, or not, depending on the relative positions of these to two elements.

The operation of the device in accordance with the invention is as follows. Because of the effect of the admission of a fluid into the interior volume defined above, via the second admission channel, that interior volume increases, leading to the hollow piston sliding around the routing tube. There follows a longitudinal movement of the single distribution nozzle to a deployed position thereof in which it is spaced from the hollow body of the device in accordance with the invention. As long as the relative positions of the routing tube and the routing chamber are such that the O-ring seals the sliding of the routing chamber around the routing tube, the fluid admitted into the aforementioned interior volume is confined therein and is not able to reach the routing chamber. A seal, for example of the lip seal type, may advantageously be placed in this interior volume to guarantee this seal. When the relative positions of the routing tube and the routing chamber are such that the O-ring is in the enlarged diameter part of the routing chamber and/or in the admission chamber, as indicated above, the latter enables the interior volume defined above to communicate with the routing chamber. The fluid admitted into the aforementioned interior volume can then spread into the routing chamber where it may, for example, depending on the intended application, be mixed therein with another fluid admitted via the first admission channel and via the routing conduit defined above. The fluid or fluids then present in the routing chamber may thereafter be routed via the distribution conduit to the single distribution nozzle from which they will be delivered by the device in accordance with the invention.

The invention therefore makes it possible, using a simple and compact device, to choose to distribute selectively:
- a single fluid or mixture of fluids, admitted via the single first admission channel; in this case, the distribution will be continuous, or
- a single fluid or mixture of fluids, admitted via the single second admission channel; in this case the distribution will be discontinuous, or
- a mixture of fluids or of mixtures of fluids, respectively admitted via the first and second admission channels. In this case, a great variety of distribution profiles can be obtained, depending on the feeding profiles chosen for the various admission channels: simultaneous admission of the two fluids or mixtures of fluids, admission of one fluid or of one mixture of fluids offset in time relative to the admission of the other fluid or mixture of fluids, etc.

The device in accordance with the invention advantageously also includes a spring adapted to be compressed when, because of the effect of the admission of a fluid into the interior volume defined above via the second admission channel, the hollow piston is caused to slide around the routing tube by the effect of the increase in said interior volume. Conversely, this spring is adapted to return said hollow piston into an initial position when the admission of fluid via the second admission channel ceases and, because of the effect of the reduction of the aforementioned interior volume that results from this, the relative positions of the routing chamber and the routing tube are again such that the O-ring enables sealed sliding of these two elements relative to each other.

Figure 2:
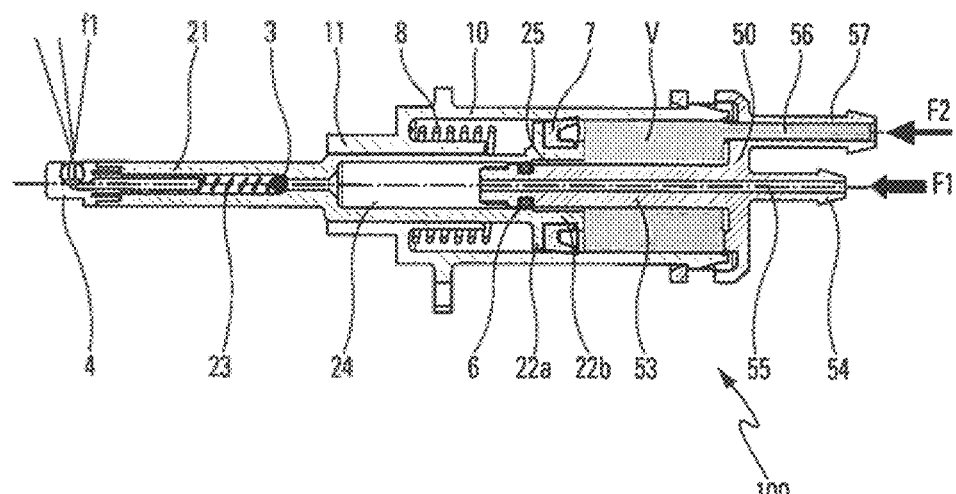
Figure 3:
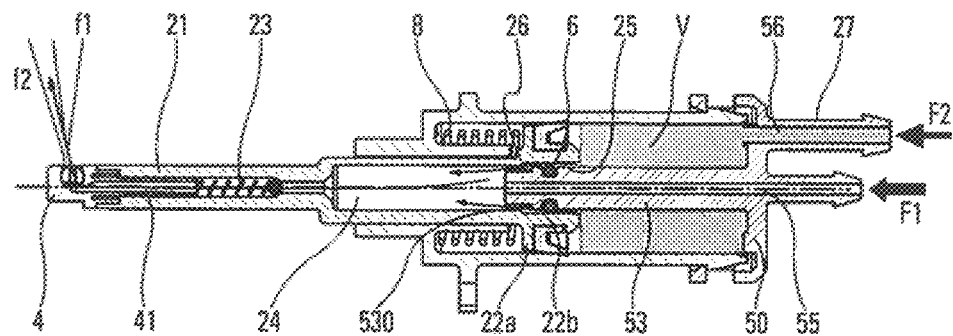
Figure 4:
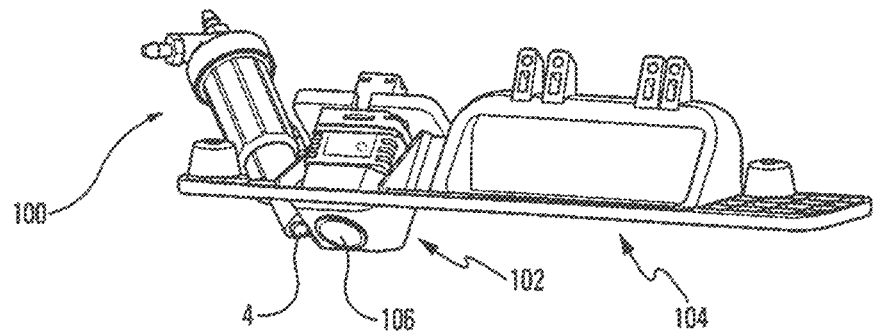
Figure 5:
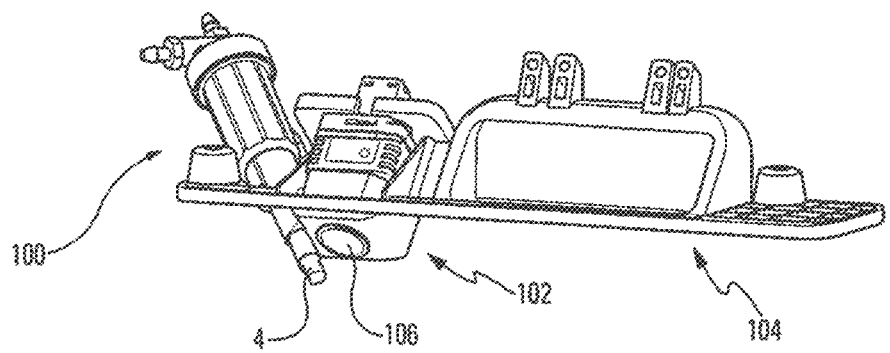

Other features, details and advantages of the invention will emerge more clearly on reading the description given hereinafter by way of illustration and with reference to the drawings, in which:

FIG. 1 is a sectional general view of a device in accordance with the invention in a first operating position, FIG. 2 is a sectional general view of a device in accordance with the invention in a second operating position, FIG. 3 is a sectional general view of a device in accordance with the invention in a third operating position, and FIGS. 4 and 5 are perspective views of a device in accordance with the invention and of the sensor to be cleaned, in a rest position (FIG. 4) and a working position (FIG. 5).

It should first be noted that the figures show the invention in detail for the purposes of its reduction to practice, but that said figures may of course serve to define the invention more clearly if necessary.

In the following description, the terms "upstream" and "downstream" refer to the direction of flow of the cleaning fluids in the cleaning device in accordance with the invention. Accordingly, the term "upstream" refers to the side of the device on which the fluid or fluids is or are admitted into the device in accordance with the invention, and the term "downstream" refers to the side of the device in accordance with the invention on which the fluid or fluids is or are distributed to the outside of the device in accordance with the invention.

Referring to FIGS. 4 and 5, a cleaning device 100 is disposed in the vicinity of a sensor 102, fixed to a support 104 forming part of or mounted on a bodywork element of a motor vehicle. Here the device is arranged in an inclined disposition relative to the plane of the support, so that its free end, carrying an injection nozzle 4, when it is deployed (FIG. 5), faces the face 106 of the sensor to be cleaned, the face that faces towards the outside of the vehicle, and is set back from this face 106 to be cleaned when it is retracted (FIG. 4).

The cleaning device 100 in accordance with the invention includes in particular a hollow body 1 of circular symmetry about its longitudinal axis X and the interior volume of which is adapted to receive a hollow piston 2 that slides along this longitudinal axis X and is also of circular symmetry about the longitudinal axis X.

To be more precise, the hollow body 1 is composed of a first hollow cylinder 10 the revolution axis of which coincides with the longitudinal axis X and a substantially cylindrical hollow tube 11 the axis of revolution of which also coincides with the longitudinal axis X. The outside diameter of the hollow tube 11 is less than the outside diameter of the first cylinder 10. As FIGS. 1 to 3 show, the hollow tube 11 extends from the downstream end of the first hollow cylinder 10 both toward the exterior and toward the interior of this first hollow cylinder 10. The first hollow cylinder 10 and the hollow tube 11 therefore define in the hollow body 1 a first cavity 12 and a second cavity 13, respectively. These two cavities 12, 13 are in communication and coaxial around the longitudinal axis X of the hollow body 1, and the inside diameter of the first cavity 12 is greater than the inside diameter of the second cavity 13. The second cavity 13 is a through-cavity extending from one end to the other of the hollow tube 11 and the first cavity 12 is open at the upstream end of the first hollow cylinder 10, opposite the end from which the hollow tube 11 extends. In other words, the hollow body 1 substantially takes the form of a first hollow cylinder 10, with longitudinal axis X, the interior volume of which forms, along the longitudinal axis X, a first cylindrical cavity 12 open at the admission or upstream and of the hollow body and the end well of which, situated at the downstream end, opposite the admission end, is coaxially pierced by a hollow tube 11 of smaller diameter, a part of which extends in the upstream direction, inside the first cavity 12, and another part of which extends in the downstream direction, outside the hollow body 1, from the end wall of the first hollow cylinder 10.

The hollow piston 2 coaxial with the body 1 is, broadly speaking, formed of a substantially cylindrical central part 20 from which extend in the downstream direction and in the upstream direction, respectively, a distribution terminal part 21 that is also substantially cylindrical and an admission part 22. The central part 20, the distribution terminal part 21 and the admission part 22 are all of circular symmetry about the longitudinal axis X of the hollow body 1. The outside diameter of the distribution terminal part 21 is less than the inside diameter of the second cavity 13 of the hollow body 1, and the outside diameter of the central part 20 is very slightly less than the inside diameter of this second chamber 13 so that this central part 20 can slide with a snug fit inside this second cavity 13 without friction) and without excessive clearance. Moreover, the admission part 22 has a flange 22a projecting substantially perpendicularly from the longitudinal wall delimiting the hollow piston along the axis and a tip longitudinally extending said wall toward the upstream end of the hollow piston 2 with a radial offset, the inside diameter of this tip 22b being greater than the inside diameter of the central part 20. The flange 22a has a maximum outside diameter very slightly less than the inside diameter of the first cavity 12 in the hollow body 1 so that this admission part 22 can slide with a snug fit inside this first cavity without friction and without excessive clearance.

In accordance with the invention, the three parts of the hollow piston 2 are coaxially pierced by a set of through-conduits and through-chambers communicating with one another.

To be more precise, the distribution terminal part 21 is pierced by a distribution-through conduit 23 the inside diameter of which, as the figures show, includes a constriction in the vicinity of the end at which the distribution terminal part 21 is attached to the central part 20 of the hollow piston 2, i.e. in the vicinity of the upstream end of the distribution terminal part 21. At the level of this constriction, the distribution conduit 23 therefore forms a shoulder 230. In accordance with the invention, a non-return valve 3, which may be a ball valve, a gate valve, a flap valve or a double-flap valve, for example, is received in the shoulder 230 formed in the distribution conduit 23. At its downstream end, opposite that at which it is attached to the central part 20, the distribution terminal part 21 is adapted to receive a distribution nozzle 4. This nozzle, of substantially cylindrical general shape, coaxial with the longitudinal axis X of the hollow body 1 and the hollow piston 2, is pierced by a distribution channel 41 and a delivery channel 42 communicating with the distribution channel 41 and substantially perpendicular thereto. The distribution channel 41 is substantially in line with the distribution conduit 23 in the terminal part 21 of the hollow piston 2 and the delivery channel 42 leads to a distribution orifice 43 on the surface of the distribution nozzle 4.

The distribution nozzle 4, the outside diameter of which is substantially equal to that of the distribution terminal part 21 of the hollow piston 2, substantially forms a plug at the end of the latter and is fixed inside the distribution conduit 23 to the distribution terminal part by forcible insertion of an appendix 44 delimiting the distribution channel 41. Other appropriate shapes, not described here, may advantageously be conjointly provided hi the downstream end of the distribution conduit 23 and on the distribution nozzle 4 in order to enable immobilization of the latter inside this conduit.

In accordance with the invention, the central part 20 of the hollow piston 2 is pierced longitudinally by a routing through-chamber 24 leading to the distribution conduit 23. In the vicinity of the admission part 22, the inside diameter of the routing chamber 24 is, in accordance with the invention, enlarged and the routing chamber 24 enlarged in this way is extended, inside the admission part, by an admission chamber 25 the inside diameter of which is at least equal to the enlarged diameter of the routing chamber 24. The admission chamber 25 extends along the longitudinal axis X from the upstream end to the downstream end of the admission part 22. In other words, the inside diameter of the admission part is larger than the inside diameter of the central part 20 forming at the junction of these two zones a shoulder 26.

As has just been described, the hollow body 1 and the hollow piston 2 therefore form an assembly with longitudinal revolution axis X in which are successively arranged, starting from a distribution nozzle 4 placed at the downstream end of a distribution terminal part 21 of the hollow piston 2, a distribution through-conduit 23, a routing through-chamber 24 and an admission through-chamber 25, all coaxial with longitudinal axis X, and all communicating with one another and with a distribution channel 41 and a delivery channel 42 arranged in the distribution nozzle 4.

In accordance with the invention, the cleaning device also includes a fluid admission and routing assembly 5 that will be now described in more detail.

As FIGS. 1 to 3 show, the fluid admission and routing channel 5 includes an inlet flange 50 arranged so that it can be placed on the upstream admission end of the hollow body 1, covering the admission part 22, in order to block these ends. To be more precise, the inlet flange 50 includes on its downstream face intended to block said ends first and second annular grooves 51, 52, respectively, coaxially arranged around the longitudinal axis X of the hollow body 1 and the hollow piston 2. The first groove 51 is defined so that it is able to receive in bearing engagement the tip 22b at the upstream end of the admission part 22 of the hollow piston 2 and the second groove 52 is adapted to receive a tip 14 at the end upstream of the hollow body 1. The inlet flange 50 is therefore able to cooperate both with the hollow piston 2 and with the hollow body 1 so as to block simultaneously the n admission upstream ends of these two parts. The flange covers the admission upstream end of the hollow body and forms means for sealed closure of that hollow body by fixing means provided to this end on the body, for example screwing means or dipping means.

In accordance with the invention, the admission part 22 and the inlet flange 50 are such that, when the inlet flange 50 is placed at the upstream end of the hollow body 1 and the admission part 22, it delimits with those elements an annular interior volume V, as FIGS. 1 to 3 show. To be more precise, the volume V is delimited on the upstream side by a downstream face of the inlet flange 50 and on the downstream side by an upstream face of the flange 22a of the admission part 22 and the volume V is radially delimited, on the one hand, by the interior wall of the first cylinder 10 of the hollow body 1 and, on the other hand, by the exterior walls of the tip 22b of the admission part 22.

In accordance with the invention, a routing tube 53 centred on the longitudinal axis X extends toward the downstream end of the cleaning device from the downstream face of the inlet flange 50. This routing tube is extended toward the outside of the device, on the downstream side of the inlet flange 50, by a first admission tip 54. The outside diameter of the routing tube 53 is advantageously made very slightly less than the inside diameter of the routing chamber 24 so that the routing tube 53 can slide freely in said routing chamber. The routing tube 53 and the first admission tip 54 are pierced by a first admission through-channel 55 that extends from one to the other of the routing tube 53 and the first admission tip 54. In the preferred embodiment illustrated by FIGS. 1 to 3, the inside diameter of the first admission channel 55 is substantially equal to the inside diameter of the smaller part of the distribution conduit 23, on the upstream side of a non-return valve 3. A step is advantageously also provided at the periphery of the downstream end of the routing tube 53. This step therefore defines a narrow annular shoulder 530 at the downstream periphery of the routing tube 53 and a downstream terminal tip 531 of this routing tube.

In accordance with one feature of the invention, an annular groove 532 is radially arranged at the periphery of the routing tube 53. The annular groove 532 is advantageously placed in the vicinity of the downstream end of the routing tube 53. In accordance with the invention, the annular groove 532 advantageously receives a seal 6, preferably an O-ring, the function of which will be explained later and the dimensions of which are advantageously chosen, in accordance with the invention, so that it provides for sealed sliding of the routing tube 53 in the smaller diameter part of the routing chamber 24.

In accordance with the invention, a second admission channel 56 is arranged in a second admission tip 57 that extends from the inlet flange 50, on the upstream side thereof, and parallel to the first admission tip 54, The second admission channel passes through the inlet flange 50 and is placed on the latter so that it advantageously leads into the volume V defined above.

The operation of the cleaning device in accordance with the invention will now be described, in which device the hollow piston is rendered mobile inside the hollow body by the effect of a fluid between a first position shown in FIGS. 1 and 4 and a working position shown in FIGS. 2, 3 and 5.

In the first position, or rest position, of the device, if it is imagined that a first fluid is injected via the first injection tip 54 in the direction shown by the arrow F1, that first fluid is first of all routed by the first admission channel 55 to the downstream end of the routing tube 53. There the first fluid is discharged into the routing chamber 24, at the downstream end of the terminal tip 531 of the routing tube 53. In the position shown in FIG. 1, the presence of the seal 6, which seals the sliding of the routing tube 53 in the smaller diameter part of the routing chamber 24, prevents the first fluid returning toward the upstream end of the routing chamber 24 of the device. The first fluid is therefore then routed in the distribution conduit 23, in which the non-return valve 3 also prevents any return toward the upstream end, and then, finally, toward the distribution channel 41 and, to finish, into the delivery channel 42 and then through the distribution orifice 43. In the rest position shown in FIG. 1, it is therefore possible to inject via the distribution nozzle 4 a first fluid routed through the cleaning device in accordance with the invention. However, this injection is effected when the distribution orifice is in a retracted position, i.e. with a hollow body 2 in an original position in which the admission part 22 is in the vicinity of the inlet flange, and it is clear that in this retracted position the fluid ejected by the nozzle is not directed onto the face to be cleaned of the sensor, for example the lens of a video camera.

To obtain the second position of the cleaning device in accordance with the invention, or first working position, shown in FIG. 2, in which the nozzle is deployed longitudinally to face toward the face to be cleaned of the sensor (as can be seen in FIG. 5), a second fluid is injected into the device, to be more precise via the second admission tip 57, in the direction represented by the arrow F2. The second fluid is routed in the second admission channel 56 to the annular interior volume V defined above. There, because of the effect of its injection pressure, the second fluid pushes the admission part 22 of the hollow piston 2 in the direction of the downstream end of the device in accordance with the invention in such a way that the volume V increases. A seal 7, for example of the lip seal type, is advantageously placed on the upstream face of the admission part 22 that is in contact with the second fluid in order to prevent the latter from leaking out of the volume V. The hollow piston 2 then slides inside the hollow body 1, around the routing tube 53. When it slides in this way, the routing chamber slides around the routing tube 53 relative to the latter and the terminal part 21 of the hollow piston is moved toward the downstream end of the cleaning device, thereby defining a deployed first position of the injection nozzle 4. In the position shown in FIG. 2, the relative positions of the routing chamber 24 and of the routing tube 53 that result from the filling of the interior volume V with the second fluid are such that the sliding of these two elements relative to each other is still sealed by the presence of the O-ring 6.

The first fluid can then be injected and routed inside the device in accordance with the invention to the distribution orifice 43 of the distribution nozzle 4, whence it is distributed in the directions shown by the arrows f1 as just described.

FIG. 3 shows a position in which the admission of the second fluid has been maintained so that the interior volume V has further increased and the downstream travel of the hollow piston 2 has been extended. In this position, the O-ring 6 and at least the annular shoulder 530 are inside the admission chamber 25 formed in the admission part 22, the inside diameter of which is at least slightly greater than the greatest inside diameter of the routing chamber 24. As a result of this the O-ring 6 no longer seals the sliding of the routing tube 53 inside the routing chamber 24 and a transverse clearance is provided between the O-ring 6 and the admission chamber 25 so as to establish communication between the interior volume V defined above and said routing chamber 24, as shown in FIG. 3, it follows that there is no longer any obstacle to the passage of the second fluid into the routing chamber 24 via the admission chamber 25 and the periphery of the terminal tip 531 of the routing tube 53. This passage is shown in FIG. 3 by the arrow f2. First and second fluids can then mix in the routing chamber 24 and then in the distribution conduit 23 and finally in the injection nozzle 4, whence the mixture obtained in this way can be delivered via the distribution orifice 43.

It is to be noted that the presence of the non-return valve 3 makes it possible, as before, to prevent any return of the mixture of fluids in the upstream direction. It is also to be noted that, in this position, the distribution nozzle 4 is still pushed toward the downstream end of the device, into a second deployed position. Finally, it is to be noted that the presence of the terminal tip 531, the outside diameter of which is substantially less than the outside diameter of the routing tube 53, enables easier routing of the mixture of fluids inside the routing chamber, whilst avoiding any "suction" effect when the O-ring 6 crosses the enlarged zone of the inside diameter of the routing chamber 24. To this end, the precise placing of the annular groove 532 that receives the O-ring 6 and the longitudinal dimension of this terminal tip will advantageously be chosen to minimize the distance separating the crossing of this enlargement by the O-ring 6 and its crossing by the shoulder 530 of the routing tube 53. In other words, the groove 532 and the shoulder 531 will advantageously be as close to each other as possible in the longitudinal direction of the device in accordance with the invention.

As FIGS. 1 to 3 show, a spring 8 is advantageously disposed in the first cavity 12 of the hollow body 1. To be more precise, the spring 8 is placed around the hollow piston 2, inside the first cavity 12, and is gripped between, on the upstream side, the flange 22a of the admission part 22 and, on the downstream side, a wall of the downstream end of the first cavity 12. As it is moved by the effect of the admission of the second fluid, the hollow piston compresses this spring 8, as FIGS. 2 and 3 show in more detail.

When the admission of the second fluid ceases, the downstream travel of the hollow piston also ceases, and the return force of the spring 8 then returns the hollow piston 2 in the upstream direction with the result that the liquid remaining in the interior volume V returns into the reservoir because of the effect of this pressure. To be more precise, the hollow piston 2 is returned in the upstream direction until the O-ring 6 again crosses, this time in the upstream direction, the enlarged zone of the inside diameter of the routing chamber 24. Once this zone has been crossed, the O-ring again seals the relative sliding of the routing chamber and the routing tube. An auxiliary device, not shown in the figures, could be added to the cleaning device so that, once the admission of the second fluid into the interior volume V has stopped and once the hollow piston has returned to its position shown in FIG. 2, the residual amount of the second fluid in said interior volume V is drained, so that the return spring 8, in its upstream movement, returns the whole of the cleaning device to its initial rest position, as shown in FIG. 4.

Depending on the amount of second fluid admitted into the device, the invention therefore makes it possible to route selectively to the single distribution nozzle 4 and its distribution orifice 43 either a single first fluid or a mixture of a first fluid and a second fluid. It is of course to be noted that the first and second fluids may be gases or liquids without this compromising the invention, likewise that they may consist of a single fluid or of mixtures of fluids without this changing the invention or how it functions. A preferred application is for the second fluid to be a cleaning liquid with the result that it exits via the cleaning nozzle when the latter has been moved into the working position, facing toward the face of the sensor to be cleaned, for example a video camera lens, by the action of that cleaning liquid, and for the first fluid to be air, that is injected into the device after the passage of the cleaning liquid into the injection nozzle to purge the residual liquid in the device and to prevent the possibility of icing up and/or to dry the lens that has been cleaned.

Moreover, the device in accordance with the invention as has just been described and as is shown in the figures is simple, reliable in operation and easy to mass produce. It therefore has a particular benefit for the intended automotive application.

In a variant embodiment of the invention, the second fluid may contribute only to the longitudinal movement of the hollow piston to bring the nozzle into the deployed working position and only the first fluid is injected into the routing chamber, the distribution channel and the nozzle. To this end the hollow piston, or more easily the routing tube 53, would be sized differently so that, in the working position, the seal 6 is still in the smaller inside diameter part of the routing chamber. There could equally well be provided an admission chamber 25 of the same inside diameter as the routing chamber. In all these cases, when the hollow piston is in the working position, the second fluid is retained in the interior volume V and cannot enter the routing chamber 24 and mix with the first fluid. In this case, there could be provision for routing to the nozzle either a first fluid or a mixture of a first fluid and a second fluid, but only via the first admission channel 55.

It is to be noted that the invention should not be reduced to the means and configurations described and shown, but applies equally to all equivalent means or configurations and to any combination of such means. For example, a heating device could be provided on the upstream side of the cleaning device so that the fluids selectively routed and distributed are hot fluids to facilitate the subsequent drying of the face to be cleaned of the sensor and to prevent the formation of ice inside the cleaning device.

The invention claimed is:

1. A device for cleaning a sensor of a motor vehicle, the device comprising:
   a piston able to slide in a circular hollow body having a longitudinal axis and carrying at a first end a single nozzle for distributing one or more fluids, said piston being hollow to enable the routing to the nozzle of at least one first fluid, said hollow piston being rendered mobile, between a rest position and a working position, by the effect of a second fluid to take up the working position in which the nozzle is deployed,
   wherein the effect of the second fluid causes said hollow piston to slide in the circular hollow body.

2. The device according to claim 1, further comprising means for the selective admission and routing of one or more distinct fluids to this single distribution nozzle.

3. The device according to claim 2, wherein the means for selective admission and routing of one or more fluids include a first fluid admission tip, centred on the longitudinal axis of the circular hollow body, and a second fluid admission tip, eccentric relative to said first fluid admission tip.

4. The device according to claim 3, wherein the fluid admission tips project from an inlet flange coming to cover the hollow body and the piston at the end opposite the nozzle.

5. The device according to claim 4, wherein the second fluid is routed to an interior volume, delimited by at least one wall of the hollow piston.

6. The device according to claim 5, wherein the hollow piston and the means for selective admission and routing of one or more fluids are such that the second fluid is routed via the hollow piston to the cleaning nozzle, when the hollow piston is in said working position.

7. The device according to claim 5, wherein the hollow piston and the means for selective admission and routing of one or more fluids are such that the second fluid is retained in said interior volume when the hollow piston is in said working position.

8. The device according to claim 1, wherein return spring means are accommodated in the hollow body to bear against the hollow piston and urge said piston into the rest position.

9. The device according to claim 1, wherein the hollow piston includes a substantially cylindrical central part, able to slide inside a hollow tube coaxial with the hollow body, a distribution terminal part in which the single distribution nozzle can be inserted and immobilized, and an admission part able to slide inside a first cavity of the hollow body.

10. The device according to claim 9, wherein a distribution through-conduit, a routing through-chamber, and an admission through-chamber that are coaxial and communicate with one another are respectively arranged in the distribution terminal part, the central part (20), and the admission part of the hollow piston, and wherein the distribution conduit communicates with a distribution channel of the distribution nozzle, itself connected to an injection channel that leads to an injection orifice of this single distribution nozzle.

11. The device according to claim 10, wherein the inside diameter of the distribution conduit has, in the vicinity of the area through which the distribution conduit communicates with the routing chamber, a constriction, and wherein the shoulder formed, inside the distribution conduit, by the constriction, accepts a non-return valve.

12. The device according to claim 5, wherein a routing tube extends, from the inlet flange, inside an admission chamber and a routing chamber, in which the routing tube is able to slide coaxially with the chambers, and is extended, opposite the chambers, from the inlet flange, by the first admission tip.

13. The device according to claim 12, wherein a first admission through-channel that is coaxial with the routing chamber and with the admission chamber is arranged inside the routing tube and the first admission tip, and wherein a second admission through-channel is arranged inside the second admission tip and the inlet flange.

14. The device according to claim 13, wherein the second admission channel leads into an interior volume delimited, by the inlet flange, the admission part, and the hollow body.

15. The device according to claim 11, wherein, because of the effect of the admission of a fluid into the interior volume via the second admission channel, the sliding of the hollow piston around the routing tube resulting from the increase in the interior volume leads to a longitudinal movement of the single distribution nozzle to a deployed position thereof in which it is spaced from the circular hollow body.

16. The device according to claim 12, wherein there is an annular groove at the periphery of the routing tube, in the vicinity of its end opposite that at which it extends from the inlet flange, and where the annular groove is adapted to receive a seal an O-ring, which seals the sliding of the routing tube inside the smaller inside diameter part of the routing chamber.

17. The device according to claim 16, further comprising a seal able to seal the interior volume when the latter is filled with a fluid admitted into the volume via the second admission channel provided that the seal seals the sliding of the routing tube inside the routing chamber.

18. The device according to claim 16, wherein an inside diameter of the routing chamber is less than an inside diameter of the admission chamber.

19. The device according to claim 18, wherein the dimensions of the seal are such that, when the seal is in the admission chamber, communication of the interior volume with the routing chamber is enabled.

20. A device for cleaning a sensor of a motor vehicle, the device comprising:
a hollow piston able to slide in a circular hollow body having a longitudinal axis and carrying at a first end a single nozzle for distributing one or more fluids, said hollow piston being hollow to enable the routing to the nozzle of at least one first fluid, said hollow piston being rendered mobile, between a rest position and a working position, by the effect of a second fluid to take up a working position in which the nozzle is deployed; and means for selective admission and routing of the one or more fluids to the single distribution nozzle, wherein the means for selective admission and routing of the one or more fluids include a first fluid admission tip, centered on the longitudinal axis of the circular hollow body, and a second fluid admission tip, eccentric relative to said first fluid admission tip, wherein the first and second fluid admission tips project from an inlet flange coming to cover the circular hollow body and the hollow piston at a second end opposite the single nozzle, wherein the second fluid is routed to an interior volume, delimited by at least one wall of the hollow piston, wherein the hollow piston and the means for selective admission and routing of the one or more fluids are such that the second fluid is routed via the hollow piston to the cleaning nozzle, when the hollow piston is in said working position, and wherein there is an annular groove at a periphery of a routing tube, in vicinity of an end opposite that at which the groove extends from the inlet flange, the annular groove being adapted to receive a seal, which seals sliding of the routing tube inside a routing chamber.

21. A device for cleaning a sensor of a motor vehicle, the device comprising:
a piston able to slide in a circular hollow body having a longitudinal axis and carrying at a first end a single nozzle for distributing one or more fluids, said piston being hollow to enable the routing to the nozzle of at least one first fluid, said hollow piston being rendered mobile, between a rest position and a working position, by the effect of a second fluid to take up a working position in which the nozzle is deployed; and means for the selective admission and routing of one or more distinct fluids to this single distribution nozzle, wherein the means for selective admission and routing of one or more fluids include a first fluid admission tip, centred on the longitudinal axis of the circular hollow body, and a second fluid admission tip, eccentric relative to said first fluid admission tip, wherein the fluid admission tips project from an inlet flange coming to cover the hollow body and the piston at the end opposite the nozzle, wherein the second fluid is routed to an interior volume, delimited by at least one wall of the hollow piston, wherein the hollow piston and the means for selective admission and routing of one or more fluids are such that the second fluid is routed via the hollow piston to the cleaning nozzle, when the hollow piston is in said working position, and wherein a routing tube extends, from the inlet flange, inside an admission chamber and a routing chamber, in which the routing tube is able to slide coaxially with the chambers, and is extended, opposite the chambers, from the inlet flange, by the first admission tip.

* * * * *